US008761157B2

(12) United States Patent
Gao

(10) Patent No.: US 8,761,157 B2
(45) Date of Patent: Jun. 24, 2014

(54) METHOD AND SYSTEM FOR CALLING TRADITIONAL CIRCUIT SWITCHED DOMAIN NETWORK USER BY PACKET CORE NETWORK

(75) Inventor: Minggang Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 64 days.

(21) Appl. No.: 13/583,632

(22) PCT Filed: Nov. 24, 2010

(86) PCT No.: PCT/CN2010/079059
§ 371 (c)(1),
(2), (4) Date: Sep. 8, 2012

(87) PCT Pub. No.: WO2012/009916
PCT Pub. Date: Jan. 26, 2012

(65) Prior Publication Data
US 2012/0327930 A1 Dec. 27, 2012

(30) Foreign Application Priority Data
Jul. 23, 2010 (CN) .......................... 2010 1 0235493

(51) Int. Cl.
*H04L 12/66* (2006.01)
*H04L 12/56* (2006.01)
(52) U.S. Cl.
USPC .......................................... 370/352; 370/401
(58) Field of Classification Search
USPC .......... 370/252, 254, 351–356, 392, 400, 401
See application file for complete search history.

(56) References Cited

U.S. PATENT DOCUMENTS

| 6,765,912 | B1 | 7/2004 | Vuong | |
| 7,042,859 | B2 * | 5/2006 | Hou et al. | 370/331 |
| 7,272,134 | B2 * | 9/2007 | Iwama et al. | 370/352 |

(Continued)

FOREIGN PATENT DOCUMENTS

| CN | 1929457 A | 3/2007 |
| CN | 101442587 A | 5/2009 |
| CN | 101448203 A | 6/2009 |
| EP | 1786162 A1 | 5/2007 |

OTHER PUBLICATIONS

International Search Report in international application No. PCT/CN2010/079059, mailed on May 19, 2011.

(Continued)

*Primary Examiner* — Hong Cho
(74) *Attorney, Agent, or Firm* — Oppedahl Patent Law Firm LLC

(57) ABSTRACT

A method and a system for calling a traditional circuit switched domain network user by a packet core network. The method includes: after receiving a request message from a call session control unit, a media gateway control unit sends the call session control unit a first call progress message carrying a preset prompt tone indicating please wait; the media gateway control unit sends an initial address message to the traditional circuit switched domain network and start a preset timer; if the timer expires and the traditional circuit switched domain network does not respond, the media gateway control unit sends the call session control unit a second call progress message carrying a preset prompt tone indicating that the other party is temporarily unaccessible, and the media gateway control unit proceeds according to a preset policy. Resource waste due to waiting is avoided and better user friendliness of a service is provided.

20 Claims, 4 Drawing Sheets

(56) References Cited

U.S. PATENT DOCUMENTS

| | | | |
|---|---|---|---|
| 7,492,757 B2* | 2/2009 | Huang | 370/352 |
| 7,835,344 B1* | 11/2010 | Bartholomew et al. | 370/352 |
| 2003/0235187 A1* | 12/2003 | Iwama et al. | 370/352 |
| 2007/0153766 A1 | 7/2007 | Bienn | |
| 2007/0201663 A1 | 8/2007 | Shi | |
| 2009/0310771 A1* | 12/2009 | Vagelos | 379/202.01 |
| 2010/0135280 A1* | 6/2010 | Ikegami et al. | 370/352 |

OTHER PUBLICATIONS

English Translation of the Written Opinion of the International Search Authority in international application No. PCT/CN2010/079059, mailed on May 19, 2011.

Supplementary European Search Report in European application No. 10854946.0, EP counterpart application to PCT/CN2010/079059, mailed on Jan. 17, 2014.

* cited by examiner

METHOD AND SYSTEM FOR CALLING TRADITIONAL CIRCUIT SWITCHED DOMAIN NETWORK USER BY PACKET CORE NETWORK

TECHNICAL FIELD

The disclosure relates to interconnection techniques of a packet core network, which takes a Session Initiation Protocol (SIP) as a call control signalling, and a traditional circuit switched domain network in mobile communication technology, particularly to a method and a system for calling a traditional circuit switched domain network user by the packet core network.

BACKGROUND

The IP Multimedia Subsystem (IMS) is an Internet protocol multimedia subsystem in the 3rd Generation Partnership Project (3GPP) network, and will become a target application network for the Long Term Evolution (LTE) in implementing packet voice and Multimedia Messaging Service.

The IMS adopts an Internet Protocol (IP) packet switched domain as a bearer channel of control signalling and media transmission for the IMS, and adopts the SIP as a call control signalling so as to realize separation of the three operations of service management, session control, and bearer access.

The IMS is a standard under ongoing improvement, and has not achieved complete interconnection with the traditional circuit switched domain network as long as the LTE network is concerned. The interconnection of services of the LTE network and the traditional circuit switched domain network is especially important since the packet network and the traditional circuit switched domain network coexist in a very long period of time. How to solve the problem of interconnection between the IMS network and the traditional circuit switched domain during a call process will be a problem that needs to be solved by the LTE network.

At present, there have been relevant patents and standards dealing with the problem in this field, wherein the focus is on call efficiency and processing of signal tone of another party. Current relevant technical solutions mainly include:

Existing Technical Solution 1:

FIG. 1 illustrates a process in a Public Switched Telephone Network (PSTN) in the current 3GPP standard. It can be seen from FIG. 1 that, before Initial Address Message (IAM) addressing is performed, a media gateway control unit has performed a series of H.248 protocol interactions. The media gateway control unit does not control to open a media stream channel through the H.248 protocol until a traditional circuit switched domain network sends an Answer Message (ANM). If a called User Equipment (UE) is not found during the IAM addressing, the series of processes performed before the IAM addressing are waste of resources. In addition, the ringtone and prompt tone of the called party cannot be received since the media stream channel is opened after the ANM is sent.

Existing Technical Solution 2:

An "early media" technique is provided in RFC (Request for Comments) 3959 released by the Internet Engineering Task Force (IETF) to open the media stream channel after a media negotiation in an Offer/Answer mode is completed by a calling user and a called user. Although this method can solve the above problem, a new problem it brings about is that: in the above requirement, the "early media" technique cannot be directly used between the calling user and the called user when the two belong to different networks respectively, and the media negotiation is performed between the calling UE and a media gateway control unit. Although this solution can solve the problem of receiving the ringtone and prompt tone of the called user during the call, there also exists a greater consumption of resources at the same time, since the media gateway control unit initiates a call to a PSTN after the media negotiation is completed. All the processes performed before the IAM addressing are waste of resources if the IAM addressing fails.

Existing Technical Solution 3:

As shown in FIG. 2, when receiving an Address Complete Message (ACM) from a traditional circuit switched domain network, a media gateway control unit instructs a media gateway to open a media stream channel. When a media control equipment of a calling UE receives an 180Ring (ringing) response message, the media stream channel is directly opened if a media negotiation in the Offer/Answer mode has been completed; otherwise, a calling UE begins the media negotiation in the Offer/Answer mode with the media gateway control unit, and the media stream channel is opened after the media negotiation is completed. Based on this process, another solution corresponding to the process is shown as in FIG. 3, where after receiving an Invite (invite request) message, the media gateway control unit will not perform the media negotiation process in the Offer/Answer mode with the calling UE immediately, but begins to do so through the 180Ring or an 183 session progress response message after receiving the ACM from the traditional circuit switched domain network. After the media negotiation is completed, the media control equipment of the calling user opens the media channel.

However, the technical solutions above fail to take into consideration the following points:

(1) since cross network addressing is performed, the process of the addressing generally takes a long period of time, during which there is no status indication for the calling user, leading to poor user-friendliness;

(2) during the IAM addressing, a lot of time will be spent in vain waiting forever for the traditional circuit switched domain network to feed back an IAM addressing fail message when a problem occurs to the traditional circuit switched domain network or the called UE is out of a service area; and (3) when media negotiation in the Offer/Answer mode is performed before the IAM addressing, the previous invalid media negotiation in the Offer/Answer mode would be an extra waste of resources in case the address of the called user cannot be found.

SUMMARY

Accordingly, the main technical problem to be solved by the disclosure is to provide a method and a system for calling a traditional circuit switched domain network user by a packet core network, so as to provide better user friendliness of a service.

To solve the problem above, the technical solution of the disclosure is realized as follows:

A method for calling a traditional circuit switched domain network user by a packet core network, including: after receiving a request message sent from a call session control unit, sending, by a media gateway control unit, to the call session control unit a first call progress message which carries a preset prompt tone indicating please wait; sending, by the media gateway control unit, an initial address message to a traditional circuit switched domain network and starting a preset timer; and when the timer goes beyond a preset time and the traditional circuit switched domain network does not respond, sending, by the media gateway control unit, to the call session control unit a second call progress message which carries a preset prompt tone indicating that an other party can not be connected for the moment, and performing processing by the media gateway control unit according to a preset policy.

Wherein the step of performing processing by the media gateway control unit according to the preset policy may include: when the preset policy is to give up waiting, sending, by the call session control unit, to a calling user equipment (UE) the second call progress message which carries a preset prompt tone indicating that the other party can not be connected for the moment.

Wherein the step of performing processing by the media gateway control unit according to the preset policy may include: when the preset policy is to continue waiting, performing, by the media gateway control unit, a media negotiation with the call session control unit.

The method may further include: when receiving an address complete message from the traditional circuit switched domain network during the media negotiation, processing, by the media gateway control unit, the address complete message after the media negotiation is completed.

Wherein the step of processing the address complete message may include: translating, by the media gateway control unit, the address complete message into a ring response message and sending the ring response message to the call session control unit.

Wherein the step of processing the address complete message may further include: updating, by the media gateway control unit, a connection parameter between the media gateway control unit and the call session control unit.

Wherein the step of processing the address complete message may further include: after receiving an answer message from the traditional circuit switched domain network, opening, by the media gateway control unit, a media stream channel for a calling UE to make a call with the traditional circuit switched domain network user.

Wherein the media negotiation may be in an "Offer/Answer" mode.

Wherein the packet core network may be an internet protocol multimedia subsystem network.

A system for calling a traditional circuit switched domain network user by a packet core network, including a media gateway control unit and a call session control unit, wherein the media gateway control unit is configured to send the call session control unit a first call progress message carrying a preset prompt tone indicating please wait after receiving a request message sent from the call session control unit; and the media gateway control unit is further configured to send an initial address message to a traditional circuit switched domain network and start a preset timer; when the timer goes beyond a preset time and the traditional circuit switched domain network does not respond, the media gateway control unit sends the call session control unit a second call progress message carrying a preset prompt tone indicating that an other party can not be connected for the moment, and the media gateway control unit performs processing according to a preset policy.

The disclosure has the following beneficial effects: during an IAM addressing, the first call progress message carrying a preset prompt ringtone or a prompt voice is returned to prompt a user to wait, thus increasing user friendliness of a service. At the same time, by means of a timing mechanism, different policies can be selected by a network to respond to the status in which a called party does not respond for a long period of time, so that a calling UE can learn in time the status of the called party, thus improving the user friendliness of a service; if the policy selected by the network is to give up the call after a long period of time without response, resource waste due to waiting can then be avoided.

DETAILED DESCRIPTION

The disclosure will be described in detail with reference to the accompanying drawings and specific embodiments hereinafter.

The disclosure provides a communication system for calling a traditional circuit switched domain network user by a packet core network, wherein the system includes the following entities:

1) a calling UE, which is any communication terminal that can access a packet core network, such as a traditional fixed telephone, an Integrated Services Digital Network (ISDN) terminal, an SIP terminal, an H.323 terminal, a softphone, a Global System for Mobile Communications (GSM) mobile phone, a Code Division Multiple Access (CDMA) mobile phone, a 3G mobile phone, a Wireless Local Area Network (WLAN) terminal, a Personal Handyphone System (PHS) and the like;

2) a call session control unit, which provides functions like call control, route connection and the like for a registered user accessing the packet core network; and 3) a media gateway control unit, which provides an interconnection control function for the registered user accessing the packet core network and another traditional circuit switched domain network user to call each other and performs translation between an SIP and another call control protocol. In the disclosure, the media gateway control unit is further configured to send the call session control unit a first call progress message carrying a preset prompt tone indicating please wait after receiving a request message from the call session control unit; in addition, the media gateway control unit further sends an IAM to the traditional circuit switched domain network and simultaneously starts a preset timer; and if the timer goes beyond a preset time and the traditional circuit switched domain network does not respond, the media gateway control unit sends the call session control unit a second call progress message carrying a preset prompt tone indicating that the other party can not be connected for the moment, and the media gateway control unit proceeds according to a preset policy.

Figure 1:
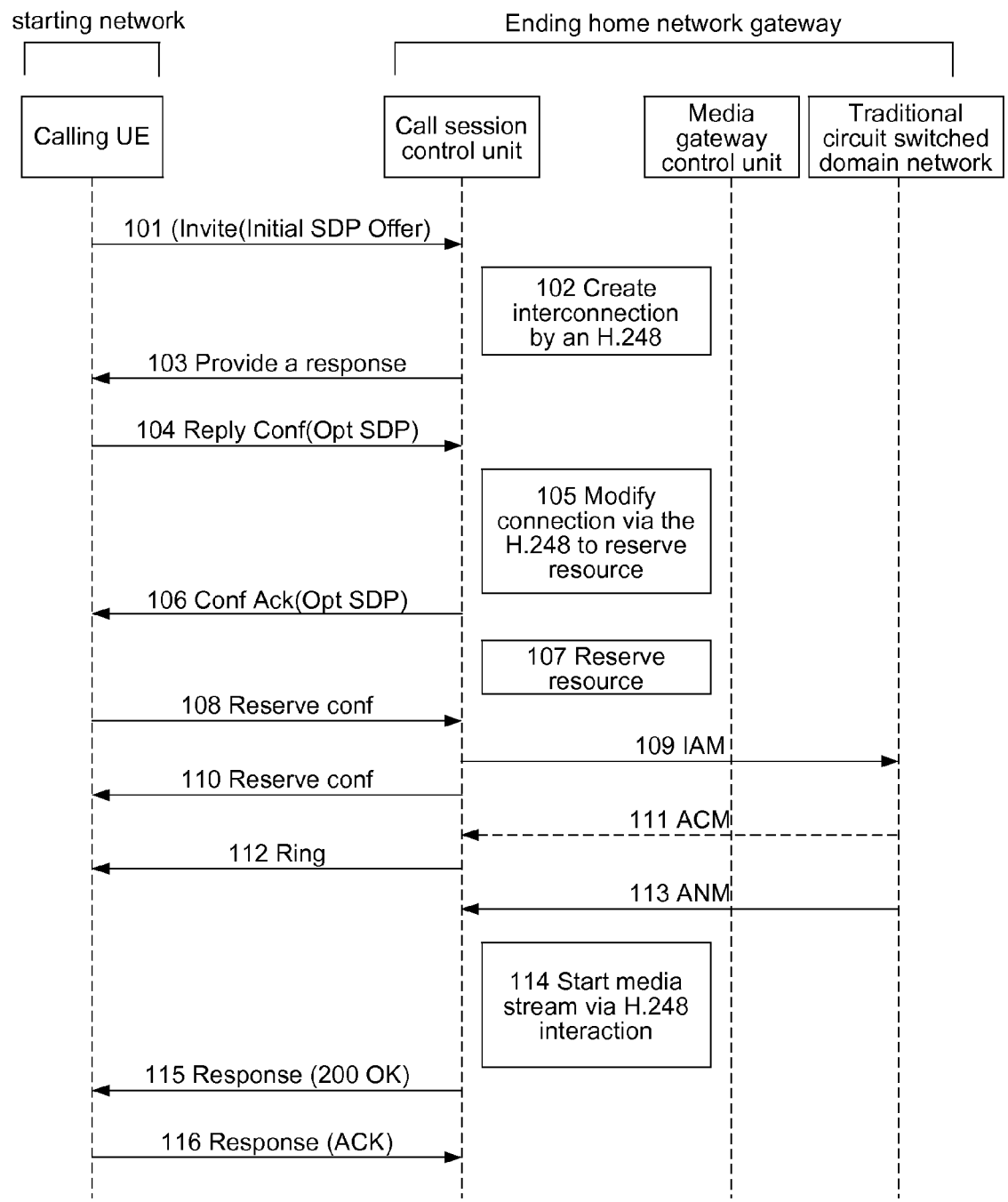
FIG. 1 shows a flowchart of an existing technical solution 1.
Figure 2:
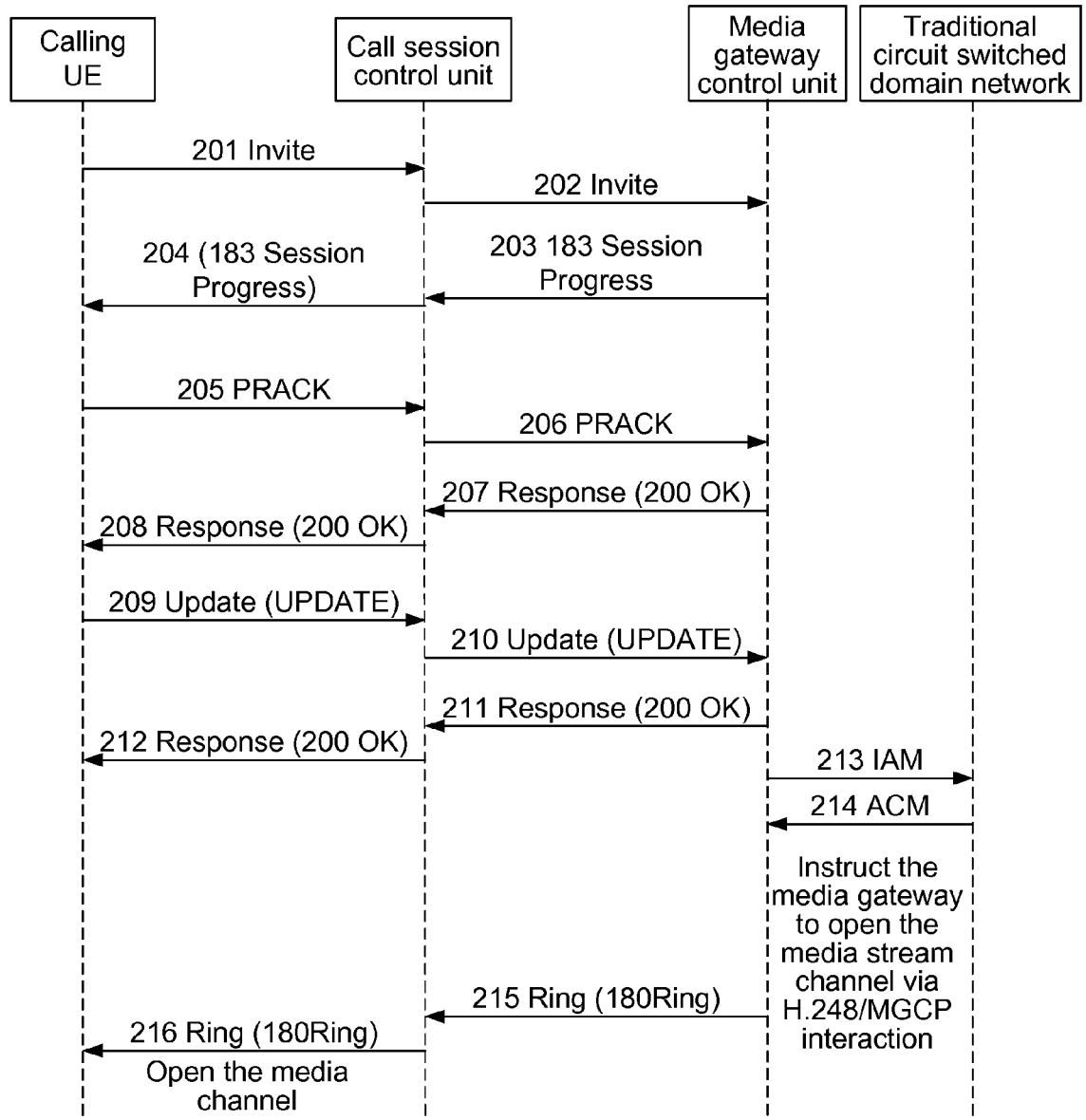
FIG. 2 shows a flowchart of one embodiment of an existing technical solution 3.
Figure 3:
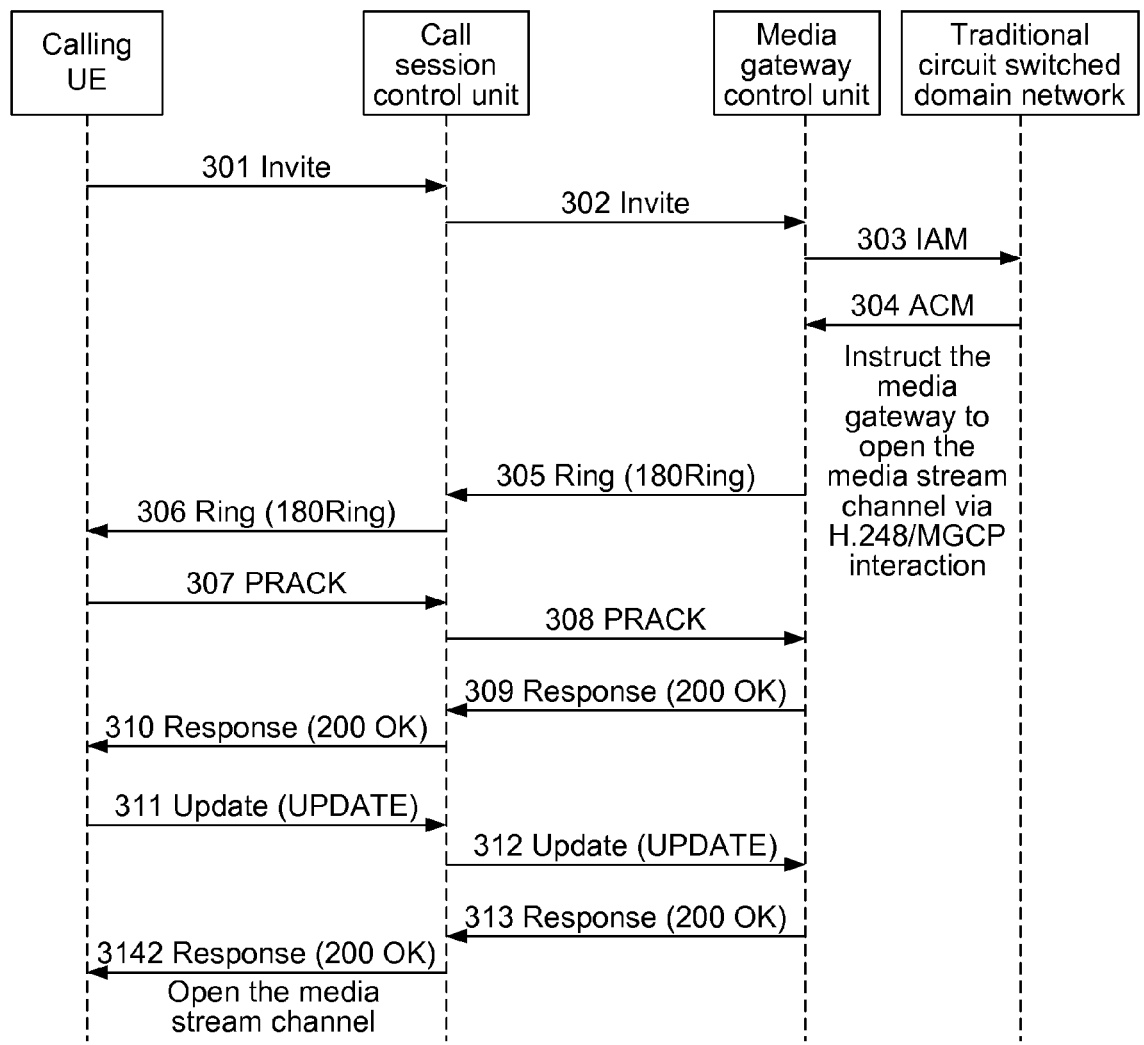
FIG. 3 shows a flowchart of another embodiment of an existing technical solution 3.
Figure 4:
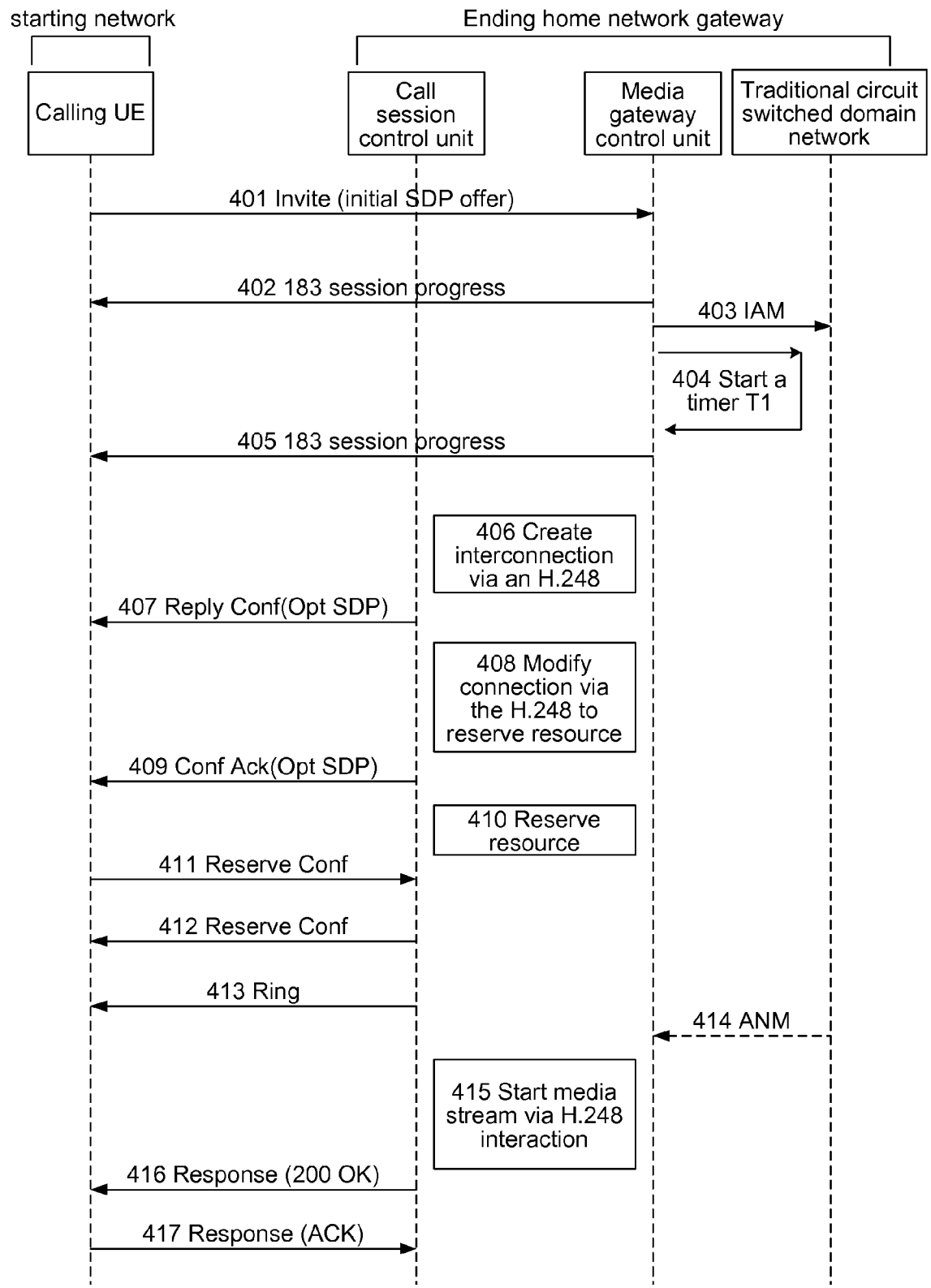
FIG. 4 shows a flowchart of an embodiment of the disclosure.

Corresponding to the system above, the disclosure provides a method for calling a traditional circuit switched domain by a packet core network; as shown in FIG. 4, the method is explained with the example of an IMS network as the packet core network; wherein the process of one embodiment of the method includes the following steps.

Step 401: a calling UE initiates a call and sends an Invite message to a call session control unit; and the call session control unit analyzes that the called party belongs to a traditional circuit switched domain network and sends an Invite message to a media gateway control unit.

Step 402: the media gateway control unit sends to the call session control unit a first call progress message (i.e., 183 Session Progress response message) to indicate that a call is being connected with the called party; and the call session control unit forwards the 183 Session Progress response message to the calling UE to indicate that a call is being connected with the called party.

In the step, a prompt ringtone or a prompt voice preset by the network is returned via the 183 Session Progress response message to prompt the user to wait, thus enhancing user friendliness of a service.

Step 403: the media gateway control unit sends an IAM to the traditional circuit switched domain network to perform addressing.

Step 404: during Step 3, the media gateway control unit starts a waiting timer T1.

Step 405: if the T1 expires and a response of the called party has not been received, the media gateway control unit sends to the call session control unit a second call progress message (i.e., another 183 Session Progress message) carrying a preset prompt tone indicating that the other party can not be connected for the moment, to notify the calling UE that the called party cannot be reached according to a preset policy; and the calling network can either choose to give up the call or continue to wait until a response tone from the called party is received; in this way, meaningless waiting can be avoided and the friendliness can be improved.

The above preset policy can be either of the policies of:

(1) giving up waiting, that is, if the network of the calling UE chooses to take the called party as is unaccessible after the T1 expires, the call process is terminated directly and a 183 Session Progress response message carrying a reasonable prompt tone is returned at the same time; in this way, not only resource waste due to waiting can be avoided but it also enables the calling UE to learn in time the status of the called party; and (2) continuing to wait unless a response message is returned by the called party. If this policy is selected, a media negotiation process (Step 406) is started at the moment. During the media negotiation, if the packet network receives an ACM (which indicates that the called party can be accessed), the ACM is not processed right away by the media gateway control until the media negotiation is completed. By this processing process, preparation can be done beforehand for responding the ACM, increasing parallelization of a service process and therefore increasing processing efficiency of a subsequent process.

Step 406: the media gateway control unit and the call session control unit establish an interconnection via an H.248.

Step 407 to Step 417 are similar to Step 104 to Step 116 in the existing technical solution 1 (i.e., process solution in the PSTN of the 3GPP standard).

Step 407: after finding the address of the called party, the traditional circuit switched domain network sends an ACM to the media gateway control unit, which translates the ACM into a 180 Ring response message and sends the 180 Ring response message to the call session control unit, which forwards the 180 Ring response message to the calling UE; and resource relocation and update of a connection parameter are performed subsequently.

Step 408: the call session control unit and the media gateway control unit modify the connection via the H.248 to reserve the resource.

Step 409: the call session control unit sends a Conf Ack (Opt SDP(Session Description Protocol)) message to the calling UE.

Step 410: the call session control unit and the media gateway control unit reserve the resource.

Step 411: the calling UE initiates a reserve Conf message to the call session control unit.

Step 412: the call session control unit sends a reserve Conf message to the calling UE.

Step 413: the call session control unit simultaneously sends a Ring response message to the calling UE.

Step 414: after receiving the call, the called party sends an ANM to the media gateway control unit, which forwards the ANM to the call session control unit.

Step 415: the call session control unit performs media interaction by the H.248 with the media gateway control unit and instructs the media gateway to open a media stream.

Step 416: the call session control unit forwards a 200 OK response message to the calling UE.

Step 417: the calling UE sends an ACK to the call session control unit.

at this point, the calling UE and the called party start a normal call with each other, and the whole call process is completed.

In the embodiments of the disclosure, the calling UE is a packet core network user, and the called party is a traditional circuit switched domain network user such as an ISDN user or a PSTN user.

It can be seen from the above method embodiment that, the disclosure has the following advantages:

(1) during the IAM addressing, a 183 Session Progress response message carrying a preset prompt ringtone or a prompt voice is returned to prompt a user to wait, so that user friendliness of a service is enhanced;

(2) during the IAM addressing, by using the timing mechanism, the network can select different policies to respond to a status in which the traditional circuit switched domain network of the called party does not response for a long period of time, so as to avoid resource waste due to waiting as well as to enable the calling UE to learn in time the status of the called party, thereby increasing user friendliness of a service;

(3) when the timer goes beyond a preset time during the IAM addressing and the network chooses to keep on trying, the media negotiation process is started now so as to prepare for a response of the called party that is to be received soon, thus making full use of the waiting time of the network, enhancing the parallelization of a service process, and therefore increasing the processing efficiency of a subsequent process; and (4) modification and update of the connection parameter are arranged after the ACM is received from the called party; and when the calling party indeed cannot find the called party or a failure occurs to the called network, update process of a session parameter needs not to be done, so that network resource is saved and unreasonable waste of network resource is avoided.

Since the IMS defined by the 3GPP is a packet core network with the SIP as a call control signalling, the disclosure is applicable to all packet core networks with the SIP as a call control signalling and with a similar IMS architecture, so that the calling user of the packet core network can receive a ringtone from the traditional circuit switched domain.

The above content are further elaboration of the disclosure with reference to specific embodiments, and the specific embodiments of the disclosure are not to be taken as limited to the description; for those skilled in the art, some simple deductions or replacements can be made without departing from the conception of the disclosure, wherein the deductions or replacements shall all be regarded as be included in the scope of protection of the disclosure.

What is claimed is:

1. A method for calling a traditional circuit switched domain network user by a packet core network, comprising:
    after receiving a request message sent from a call session control unit, sending, by a media gateway control unit, to the call session control unit a first call progress message which carries a preset prompt tone indicating please wait;
    sending, by the media gateway control unit, an initial address message to a traditional circuit switched domain network and starting a preset timer; and
    when the timer goes beyond a preset time and the traditional circuit switched domain network does not respond, sending, by the media gateway control unit, to the call session control unit a second call progress message which carries a preset prompt tone indicating that an other party can not be connected for the moment, and performing processing by the media gateway control unit according to a preset policy.

2. The method according to claim 1, wherein the step of performing processing by the media gateway control unit according to the preset policy comprises:
    when the preset policy is to give up waiting, sending, by the call session control unit, to a calling user equipment (UE) the second call progress message which carries a preset prompt tone indicating that the other party can not be connected for the moment.

3. The method according to claim 2, wherein the packet core network is an internet protocol multimedia subsystem network.

4. The method according to claim 1, wherein the step of performing processing by the media gateway control unit according to the preset policy comprises: when the preset policy is to continue waiting, performing, by the media gateway control unit, a media negotiation with the call session control unit.

5. The method according to claim 3, further comprising: when receiving an address complete message from the traditional circuit switched domain network during the media negotiation, processing, by the media gateway control unit, the address complete message after the media negotiation is completed.

6. The method according to claim 5, wherein the step of processing the address complete message comprises: translating, by the media gateway control unit, the address complete message into a ring response message and sending the ring response message to the call session control unit.

7. The method according to claim 6, wherein the media negotiation is in an "Offer/Answer" mode.

8. The method according to claim 6, wherein the packet core network is an internet protocol multimedia subsystem network.

9. The method according to claim 5, wherein the step of processing the address complete message further comprises: updating, by the media gateway control unit, a connection parameter between the media gateway control unit and the call session control unit.

10. The method according to claim 9, wherein the media negotiation is in an "Offer/Answer" mode.

11. The method according to claim 9, wherein the packet core network is an internet protocol multimedia subsystem network.

12. The method according to claim 5, wherein the step of processing the address complete message further comprises: after receiving an answer message from the traditional circuit switched domain network, opening, by the media gateway control unit, a media stream channel for a calling UE to make a call with the traditional circuit switched domain network user.

13. The method according to claim 12, wherein the media negotiation is in an "Offer/Answer" mode.

14. The method according to claim 12, wherein the packet core network is an internet protocol multimedia subsystem network.

15. The method according to claim 5, wherein the media negotiation is in an "Offer/Answer" mode.

16. The method according to claim 5, wherein the packet core network is an internet protocol multimedia subsystem network.

17. The method according to claim 4, wherein the media negotiation is in an "Offer/Answer" mode.

18. The method according to claim 4, wherein the packet core network is an internet protocol multimedia subsystem network.

19. The method according to claim 1, wherein the packet core network is an internet protocol multimedia subsystem network.

20. A system for calling a traditional circuit switched domain network user by a packet core network, comprising: a media gateway control unit and a call session control unit, wherein
    the media gateway control unit is configured to send the call session control unit a first call progress message carrying a preset prompt tone indicating please wait after receiving a request message sent from the call session control unit; and
    the media gateway control unit is further configured to send an initial address message to a traditional circuit switched domain network and start a preset timer; when the timer goes beyond a preset time and the traditional circuit switched domain network does not respond, the media gateway control unit sends the call session control unit a second call progress message carrying a preset prompt tone indicating that an other party can not be connected for the moment, and the media gateway control unit performs processing according to a preset policy.

* * * * *